(12) United States Patent
Lee et al.

(10) Patent No.: US 11,099,125 B2
(45) Date of Patent: Aug. 24, 2021

(54) OPTICAL CAVITY FOR GAS SENSOR AND GAS SENSOR HAVING THE SAME

(71) Applicant: ELT SENSOR CORP., Bucheon-si (KR)

(72) Inventors: Ihn Lee, Seoul (KR); Donghwan Kim, Bucheon-si (KR)

(73) Assignee: ELT SENSOR CORP., Bucheon-si (KR)

( * ) Notice: Subject to any disclaimer, the term of this patent is extended or adjusted under 35 U.S.C. 154(b) by 141 days.

(21) Appl. No.: 16/394,248

(22) Filed: Apr. 25, 2019

(65) Prior Publication Data

US 2020/0132595 A1 Apr. 30, 2020

(30) Foreign Application Priority Data

Oct. 24, 2018 (KR) .................... 10-2018-0127409

(51) Int. Cl.
| | | |
|---|---|---|
| *G01N 21/3504* | (2014.01) | |
| *G01N 21/03* | (2006.01) | |
| *G01N 21/61* | (2006.01) | |
| *G02B 5/10* | (2006.01) | |

(52) U.S. Cl.
CPC ....... *G01N 21/3504* (2013.01); *G01N 21/031* (2013.01); *G01N 21/61* (2013.01); *G02B 5/10* (2013.01); *G01N 2201/0636* (2013.01)

(58) Field of Classification Search
CPC .. G01N 21/031; G01N 21/3504; G01N 21/61; G01N 21/0303; G01N 21/27; G02B 5/10
See application file for complete search history.

(56) References Cited

FOREIGN PATENT DOCUMENTS

| KR | 10-2006-0034019 A | 4/2006 |
|---|---|---|
| KR | 10-1895236 B1 | 9/2018 |

*Primary Examiner* — Hina F Ayub
(74) *Attorney, Agent, or Firm* — BakerHostetler

(57) ABSTRACT

The present invention provides an optical cavity for a gas sensor having a space defined therein, including: a first parabolic reflective surface formed on one wall surface in the space; a second parabolic reflective surface which is formed at a position facing the one wall surface, and is configured to reflect again a light emitted from a light source disposed at a focus of the first parabolic reflective surface and reflected by the first parabolic reflective surface so as to change a traveling path of the light; and a hyperbolic reflective surface formed so that any one focus of two foci coincides with a focus of the second parabolic reflective surface, and is configured to reflect the light made incident from the second parabolic reflective surface to change the traveling path of the light, and a value of $c^2-b^2$ of a hyperbola equation of hyperbola forming the hyperbolic reflective surface is in a range of $0<c^2-b^2\leq 4$ mm.

4 Claims, 3 Drawing Sheets

OPTICAL CAVITY FOR GAS SENSOR AND GAS SENSOR HAVING THE SAME

CROSS-REFERENCE TO RELATED APPLICATION

Pursuant to 35 U.S.C. § 119(a), this application claims the benefit of earlier filing date and right of priority to Korean Patent Application No. 10-2018-0127409, filed on Oct. 24, 2018 in the Korean Intellectual Property Office, the entire disclosure of which is incorporated herein by reference.

BACKGROUND OF THE INVENTION

1. Field of the Invention

The present invention relates to an optical cavity for a gas sensor and a gas sensor having the optical cavity, and more particularly to an optical cavity for a gas sensor suitable for measuring a concentration of a non-carbon dioxide (CO2) based gas such as methane or Freon, and a gas sensor having the optical cavity.

2. Description of the Related Art

Techniques relating to a so-called non-dispersive type gas sensor, which measures the concentration of a gas such as carbon monoxide (CO), carbon dioxide ($CO_2$) methane or by using properties that a gas composed of two or more different atoms absorbs light of a specific wavelength band, have become increasingly common.

A global warming index of so-called non-($CO_2$) greenhouse gases such as methane ($CH_4$), nitrous oxide ($N_2O$), chlorofluorocarbons (HFCs), perfluorocarbons (PFCs) and sulfur hexafluoride (SF6) except for carbon dioxide ($CO_2$) among six greenhouse gases is known to be in a range from 21 to 23,900 times that of the carbon dioxide ($CO_2$). The Korean government is actively developing techniques for reducing the greenhouse gas, and the gas sensors may be the underlying techniques for these greenhouse gas reduction techniques.

A laser beam used as a light source in the gas sensor has advantages in terms of converging properties and straightness of light, but it also has disadvantages of generating only light having a single wavelength. In order to use the laser beam as a light source for sensors of various gases having different wavelength bands that absorb light for each type of gas, such as carbon dioxide, carbon monoxide or methane, there is a difficulty that laser beams suitable for the absorption wavelength bands should be individually developed for each type of gas.

Therefore, it is necessary to develop a gas sensor that can share the light source having a wide wavelength band, while having excellent straightness and converging properties of light such as a laser beam.

Further, in order for the non-dispersion type gas sensor to exhibit excellent sensing characteristics, an amount of absorption of light in an optical cavity of the gas sensor should be increased. To this end, the gas sensor needs to have a long length of the optical path, and the light passing through the optical cavity should be focused on a photodetector (optical detection sensor). As a conventional technique for this purpose, there is a technique described in Patent Document 1.

Patent Document 1 describes an optical cavity for a non-dispersive type gas sensor including two parabolic concave mirrors which share a focus and an optical axis. In this optical cavity, a light made incident on the focus is reflected by a mirror plane of one parabolic concave mirror and travels parallel to the optical axis, and the light made incident parallel to the optical axis is reflected by a mirror plane of the other parabolic concave mirror and passes through the focus. In the gas sensor of Patent Document 1, by using the optical characteristics of these parabolas, the optical cavity is formed by arranging two optical concave mirrors to face each other with respect to two quadratic functions having different focal lengths from each other so as to share the focus.

However, since only the parabolic reflective surface is used in the technique of Patent Document 1, there is a problem in terms of the straightness and converging properties of light.

As another prior art related to the gas sensor, there is a technique known in Patent Document 2. An optical cavity of a gas sensor disclosed in Patent Document 2 includes an elliptical reflective surface formed therein to reflect a light emitted from one focus of an ellipse and collect the light on the other focus of the ellipse, and a hyperbolic reflective surface formed therein to reflect a light, which is reflected by the elliptical reflective surface and collected on the other focus of the ellipse while forming a portion of a hyperbola whose one focus coincides with the other focus of the ellipse, and collect the light on the other focus of the hyperbola. In the above-described configuration, a center line of the hyperbola, which connects one focus of the hyperbola with the other focus of the hyperbola, is inclined to a side opposite to the elliptical reflective surface by a predetermined angle from a center line of the ellipse, which connects one focus of the ellipse with the other focus of the ellipse.

However, the technique of Patent Document 2 also has not been sufficiently studied to improve the straightness and converging properties of light. Further, there are not sufficient studies on a method for varying the length of the optical path so that the gas sensor can be used for measuring the concentrations of a plurality of types of gases by employing one optical cavity.

PRIOR ART DOCUMENT

Patent Document (Patent Document 1) Korean Patent Laid-Open Publication No. 10-2006-0034019 (published on Apr. 21, 2006)
(Patent Document 2) Korean Patent Registration Publication No. 10-1895236 (published on Sep. 7, 2018)

SUMMARY OF THE INVENTION

In consideration of the above-mentioned circumstances, it is an object of the present invention to provide an optical cavity which may use a multi-wavelength light source as a light source for measuring a concentration of gas while having excellent converging properties and straightness of light, and a gas sensor having the optical cavity.

In addition, another object of the present invention is to provide an optical cavity capable of suitably adjusting a length of an optical path for each type of gas with respect to a plurality of types of gases, and a gas sensor having the optical cavity.

In order to accomplish the above objects, according to an aspect of the present invention, there is provided an optical cavity for a gas sensor having a space defined therein, including: a first parabolic reflective surface formed on one wall surface in the space; a second parabolic reflective surface which is formed at a position facing the one wall surface, and is configured to reflect again a light emitted from a light source disposed at a focus of the first parabolic reflective surface and reflected by the first parabolic reflective surface so as to change a traveling path of the light; and a hyperbolic reflective surface formed so that any one focus of two foci coincides with a focus of the second parabolic reflective surface, and is configured to reflect the light made incident from the second parabolic reflective surface to change the traveling path of the light, wherein when a value of a vertex in an x-axis direction of a hyperbola forming the hyperbolic reflective surface is a, a value of the focus is c, and a value of a vertex in a y-axis direction is b (b=a), a value of $c^2-b^2$ of a hyperbola represented by Equation below is in a range of $0<c^2-b^2 \leq 4$ mm.

$$y = \sqrt{\left(\frac{b^2}{c^2-b^2}\right)x^2 - b^2}$$

In addition, according to another aspect of the present invention, there is provided a gas sensor for measuring a gas concentration, including: the above optical cavity for a gas sensor; a light source disposed at the focus of the first parabolic reflective surface; and a photodetector disposed in the space to detect a light emitted from the light source and traveling through the optical cavity for a gas sensor, and convert the detected light into an electrical signal.

According to the present invention, it is possible to provide an optical cavity which may use a multi-wavelength light source as a light source for measuring a concentration of gas while having excellent converging properties and straightness of light, and a gas sensor having the optical cavity.

According to the present invention, it is possible to provide an optical cavity capable of suitably adjusting a length of an optical path for each type of gas with respect to a plurality of types of gases, and a gas sensor having the optical cavity.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, preferred embodiments of the present invention will be described in detail with reference to the accompanying drawings.

Embodiment 1

An optical cavity for a gas sensor according to preferred Embodiment 1 of the present invention and a gas sensor having the optical cavity contains two or more parabolic reflective surfaces and one or more hyperbolic reflective surfaces. By using optical characteristics of these parabola and hyperbola, the optical cavity for a gas sensor may be formed.

Prior to describing the embodiments of the present invention, optical characteristics of parabola and hyperbola will be briefly described focusing on the portions necessary for understanding the present invention.

First, the parabola has optical characteristics, that is, characteristics in which a light originating from a focus of the parabola is reflected from an inside thereof, and then travels in a direction parallel to an x-axis direction of the parabola, while the light traveled parallel to an x-axis of the parabola inside thereof is reflected by the parabola, and then passes through the focus of the parabola. The present invention uses these two optical characteristics.

Figure 1:
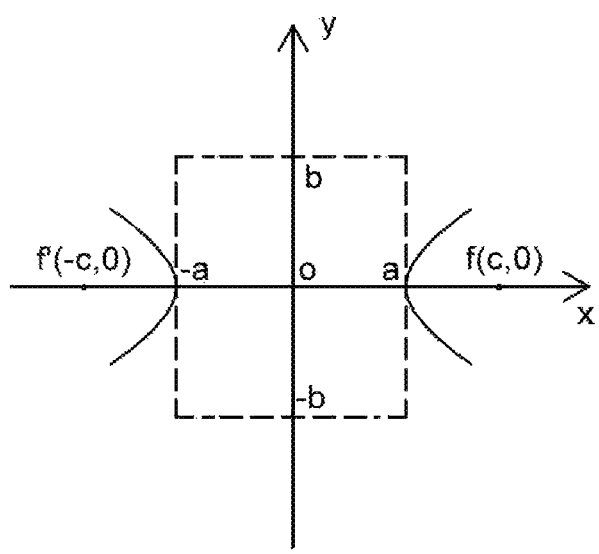
FIG. 1 is a diagram for describing optical characteristics of a hyperbola.

Next, optical characteristics of the hyperbola will be described with reference to FIG. 1. FIG. 1 is a diagram for describing the optical characteristics of the hyperbola.

One of the optical characteristics of the hyperbola is that a light which is directed to any one focus (any one of foci f and f' in FIG. 1) of two foci (f and f') of the hyperbola is reflected by the hyperbola, and then is directed to the other focus (the other one of foci f and f' in FIG. 1) of the hyperbola. Another characteristic is that a light which is reflected from the hyperbola and is directed to the other focus has greater straightness and converging properties of light as a gradient of the hyperbola is increased. The present invention also uses the two optical characteristics of the hyperbola.

In FIG. 1, when f and f' are foci of the hyperbola, O is a center thereof, a is a vertex in the x-axis direction of the hyperbola, c is a value of the focus, and b is a vertex (b=a) in a y-axis direction of the hyperbola, an equation of the hyperbola may be represented by Equation 1 below.

$x2/a2-y2/b2=1$ (Equation 1)

Wherein, the value c of the focus has a relationship with a and b as Equation 2 below.

$c^2=a^2+b^2$ (Equation 2)

Therefore, Equation 1 may be represented again as Equation 3 below.

$$y = \sqrt{\left(\frac{b^2}{c^2-b^2}\right)x^2 - b^2}$$ [Equation 3]

Wherein, the larger a value of $c^2-b^2$, the gentler the gradient of the hyperbola, while the smaller the value of $c^2-b^2$, the sharper the gradient of the hyperbola.

Then, an optical cavity 100 for a gas sensor according to preferred Embodiment 1 of the present invention will be described with reference to FIGS. 2 and 3.

Figure 2:
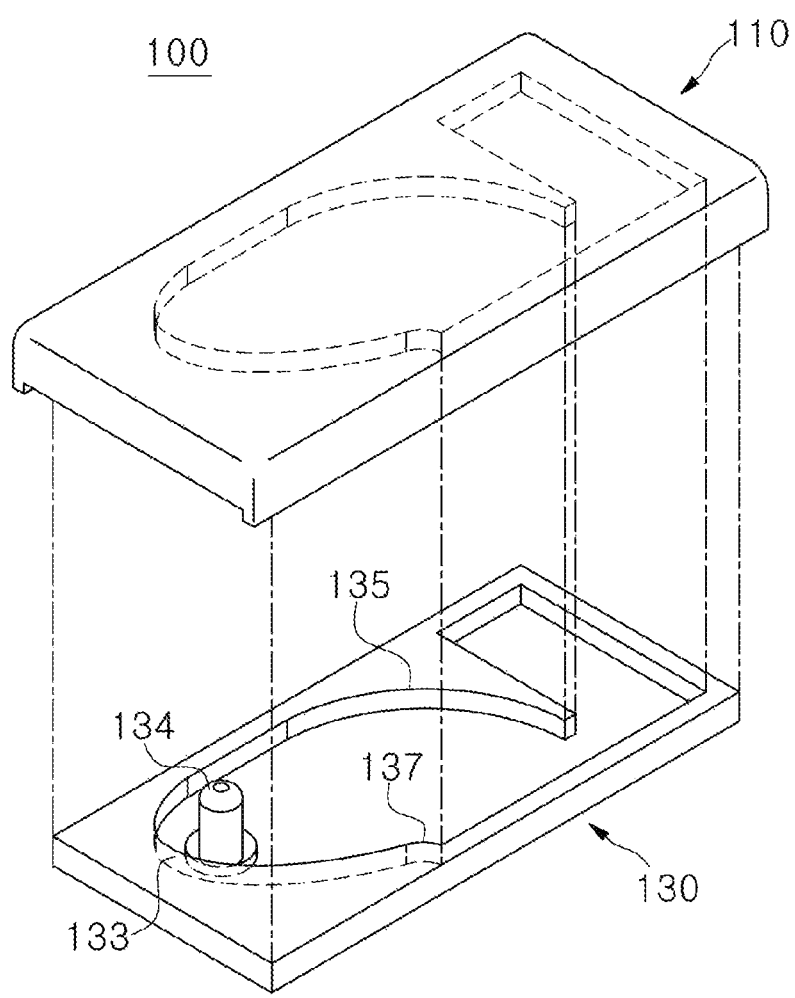
FIG. 2 is an exploded perspective view illustrating an optical cavity for a gas sensor according to preferred Embodiment 1 of the present invention.
Figure 3:
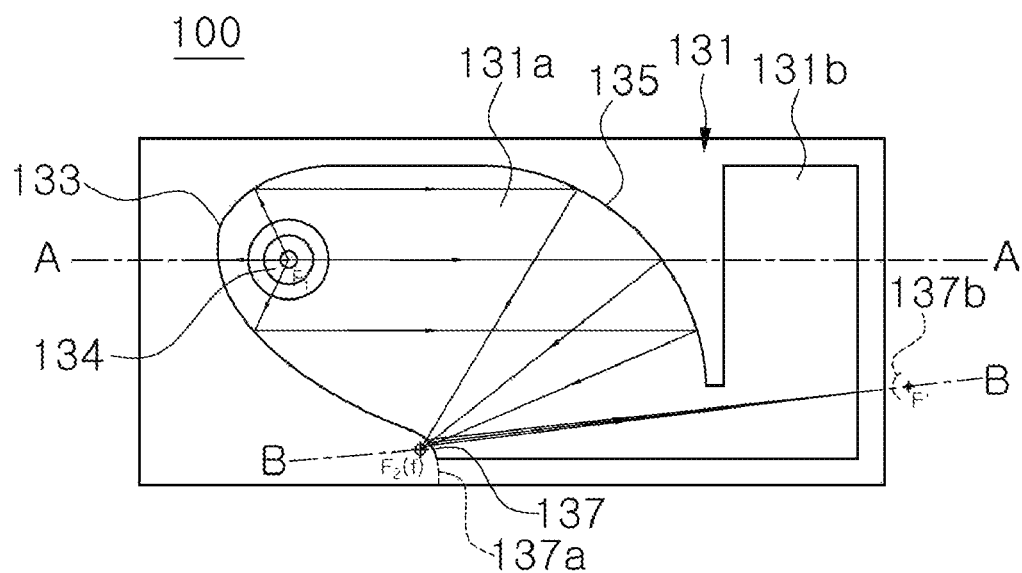
FIG. 3 is a plan view illustrating the optical cavity of FIG. 1.

FIG. 2 is an exploded perspective view illustrating the optical cavity 100 for a gas sensor according to preferred Embodiment 1 of the present invention, and FIG. 3 is a plan view illustrating the optical cavity 100 of FIG. 1.

As illustrated in FIGS. 2 and 3, the optical cavity 100 for a gas sensor according to preferred Embodiment 1 of the present invention includes an upper case 110 and a lower case 130, which are coupled to each other to define a space 131 having a predetermined size therein.

The space 131 in the optical cavity 100 is divided into a first space 131a and a second space 131b. The first space 131a and the second space 131b are formed by a ceiling surface (not illustrated), which is an inner surface of the upper case 110, a bottom surface (not illustrated), which is an inner surface of the lower case 130, and wall surfaces extending by a predetermined height from the bottom surface to the ceiling surface along edges thereof. A part of the wall surface in the first space 131a becomes a first parabolic reflective surface 133, a second parabolic reflective surface 135, and a hyperbolic reflective surface 137, which will be described in detail below.

Herein, the ceiling surface and the bottom surface are terms given for the convenience of description. For example, if the inner surface of the upper case 110 becomes the ceiling surface, the inner surface of the lower case 130 of the wall surface becomes the bottom surface, and vice versa.

The first parabolic reflective surface 133 is formed on a part of one wall surface in a longitudinal direction of the first space 131a (in a direction along a center line A-A (in the x-axis direction of the parabola) in FIG. 3), and a light source 134 is disposed at a focus $F_1$ of the first parabolic reflective surface 133. In addition, the focus $F_1$ of the first parabolic reflective surface 133 is located on the same line as the longitudinal center line A-A within the first space 131a. Accordingly, the first parabolic reflective surface 133 is disposed in a shape of surrounding a part of the focus $F_1$ of the first parabolic reflective surface 133.

In the present embodiment, an incandescent light source or an infrared light source, which emit multi-wavelength light, may be used as the light source 134. Preferably, the light emitted from the light source 134 has a wavelength in a range of 1 to 10 μm. Thereby, the optical cavity 100 according to the present embodiment may be used in all types of gas sensors having different absorption wavelength bands from each other, which will be described in detail in Embodiment 2 below.

The second parabolic reflective surface 135 is formed on a wall surface opposite to the side in which the first parabolic reflective surface 133 is formed in the longitudinal direction (the direction along the center line A-A in FIG. 3). The focus $F_2$ of the second parabolic reflective surface 135 is formed at a position apart from the center line A-A at a predetermined distance in a direction substantially perpendicular to the direction along the center line A-A (substantially the y-axis direction of the parabola). Accordingly, the light reflected by the second parabolic reflective surface 135 travels in a state in which its traveling direction is inclined by a predetermined angle with respect to the center line A-A.

In the present embodiment, the first space 131a has a shape in which a curvature of the first parabolic reflective surface 133 is smaller than the curvature of the second parabolic reflective surface 135, that is, a distance between an origin O of the first parabolic reflective surface 133 and the focus $F_1$ is shorter than the distance between the origin O of the second parabolic reflective surface 135 and the focus $F_2$.

The hyperbolic reflective surface 137 is formed in such a way that a vertex thereof faces in a direction substantially parallel to the center line A-A at a position in which any one focus f of two foci f and f' of the hyperbolas 137a and 137b serving as the bases of the hyperbolic reflective surface 137 and the focus $F_2$ of the second parabolic reflective surface 135 coincide with each other (i.e., $F_2$=f) (actually, it is inclined by a predetermined angle θ with respect to the center line A-A, and the reason thereof will be described in Embodiment 2 below).

More specifically, as illustrated in FIG. 3, the hyperbolic reflective surface 137 is formed in front of any one focus f of the two foci f and f' of the hyperbolas 137a and 137b (the same position as the focus $F_2$ of the second parabolic reflective surface 135), that is, in front of any one focus f of the hyperbolas 137a and 137b on a center line B-B which is an axis connecting the two foci f and f' of the hyperbolas 137a and 137b.

Of course, the hyperbolic reflective surface 137 is a part of one hyperbola 137a of the hyperbolas 137a and 137b, and the hyperbola 137b indicated by a dotted line in FIG. 3 is an imaginary line. Actually, no additional surface such as the hyperbolic reflective surface 137 is formed on the hyperbolas 137b side.

In FIG. 3, the first parabolic reflective surface 133, the second parabolic reflective surface 135 and the hyperbolic reflective surface 137 are indicated by lines, but as illustrated in FIG. 2, actually, all the first parabolic reflective surface 133, the second parabolic reflective surface 135 and the hyperbolic reflective surface 137 are surfaces having a predetermined width. Therefore, although the term "parabola or hyperbola" is used for the convenience of description, it should be understood that these are actually faces having a predetermined width, not the lines.

The first parabolic reflective surface 133, the second parabolic reflective surface 135 and the hyperbolic reflective surface 137 are subjected to mirror finishing so as to allow the light made incident on these surfaces to be reflected without loss as much as possible.

A photodetector (not illustrated) is disposed on the other focus f' side of the two foci f and f' of the hyperbolas 137a and 137b, which receives a light (an optical signal) emitted from the light source 134 and reflected by the first parabolic reflective surface 133, the second parabolic reflective surface 135 and the hyperbolic reflective surface 137 while passing through the first space 131a inside the optical cavity 100, and converts the received optical signal into an electric signal. The arrangement position of the photodetector will be described below.

Further, although not illustrated in FIGS. 2 and 3, the optical cavity 100 of the present embodiment is provided with a gas inlet and a gas outlet, which serve as passages, through which a gas to be a target for measuring the concentration, enters and exits.

In addition, the gas sensor of the present invention may include an amplifier (not illustrated) for amplifying the electric signal output from the photodetector, a gas concentration calculating means (not illustrated) for calculating a gas concentration based on the electric signal amplified by the amplifier and the like. All of these components use the techniques known in the art, therefore will not be described in detail herein.

Next, an optical path serving as a path in which the light emitted from the light source 134 travels through the space 131 in the optical cavity 100 according to Embodiment 1 of the present invention will be described with reference to FIG. 3.

The light emitted from the light source 134 disposed at the focus $F_1$ of the first parabolic reflective surface 133 is reflected by the first parabolic reflective surface 133 subjected to mirror finishing, then travels in a direction parallel to the x-axis direction of the parabola, and reflected again by the second parabolic reflective surface 135 during traveling, thereby being collected to the focus $F_2$ of the second parabolic reflective surface 135 by changing the traveling direction thereof.

As described above, the focus $F_2$ of the second parabolic reflective surface 135 coincides with any one focus f of the two foci f and f' of the hyperbolic reflective surface 137.

Therefore, the light reflected by the second parabolic reflective surface 135 and collected to the focus $F_2$ of the second parabolic reflective surface 135 is reflected again by the hyperbolic reflective surface 137, thereby changing again the traveling direction thereof, then travels to the other focus f' of the two foci f and f' of the hyperbolas 137a and 137b, and detected by the photodetector.

Next, in the optical cavity 100 of Embodiment 1 of the present invention, a method for improving the converging properties and straightness of light detected by the photodetector, which is the problem to be solved by the present invention, will be described with reference to FIGS. 1 to 3.

In the gas sensor (or gas analyzer) and the like, the length of the optical path is commonly set to be 1,000 mm or less. If the length of the optical path exceeds 1,000 mm, an accuracy of the concentration measurement is remarkably lowered, such that there is a problem in practical use.

In general, in a tunable diode laser absorption spectroscopy (TDLAS) type of gas analyzer, a pointer region of the light finally collected by passing through the optical cavity (the light collected and detected by the photodetector) has a size of 10 mm or less.

With the above-described situation of the conventional gas sensor (gas analyzer), in consideration of the fact of the optical characteristics of the hyperbola described above, the light reflected by the hyperbola and directed to the other focus has larger straightness and converging properties as the gradient of the hyperbola is increased, the value of $c^2-b^2$ in Equation 3 was measured at a point 1,000 mm apart from the hyperbolic reflective surface 137 by the present inventors while varying the same in various ranges. The measured results are illustrated in Table 1 below.

TABLE 1

| Value of $c^2-b^2$ (mm) | Converging angle (Degree) | Size of pointer region (mm) |
|---|---|---|
| 0.1 | 0.01 | 0.25 |
| 0.5 | 0.07 | 1.26 |
| 1.0 | 0.12 | 2.51 |
| 1.5 | 0.22 | 3.77 |
| 2.0 | 0.29 | 5.02 |
| 2.5 | 0.36 | 6.28 |
| 3.0 | 0.43 | 7.54 |
| 3.5 | 0.50 | 8.79 |
| 4.0 | 0.58 | 10.00 |
| 4.5 | 0.65 | 11.31 |
| 5.0 | 0.72 | 12.56 |
| 5.5 | 0.79 | 13.82 |
| 6.0 | 0.86 | 15.07 |
| 6.5 | 0.94 | 16.33 |

Herein, the value of $c^2-b^2$ may not be zero (0), and should always be greater than 0. In this condition, the size of the pointer region of the light collected at the point 1,000 mm apart from the hyperbolic reflective surface 137 should be 10 mm or less. Therefore, the value of $c^2-b^2$, in which the size of the pointer region of the light converged at the point 1,000 mm is 10 mm or less in Table 1, should satisfy a condition that it is greater than 0 but 4 mm or less ($0<c^2-b^2\leq 4$ mm).

Accordingly, when the value of the vertex in the x-axis direction of the hyperbola having the center O is a, the value of the focus is c, and the value of the vertex in the y-axis direction is b (b=a), the value of $c^2-b^2$ of hyperbolic reflective surface 137 of the present invention, which is represented by Equation 3, is preferably set to be in a range of larger than 0 but 4 mm or less ($0<c^2-b^2\leq 4$ mm). In this range, the light detected by the photodetector has the most excellent converging properties and straightness of light. Therefore, of course, the measurement accuracy of the gas concentration of the gas sensor having the above-described optical cavity is also excellent.

Embodiment 2

An optical cavity for a gas sensor according to Embodiment 2 of the present invention is configured so that the optical cavity 100 for a gas sensor according to Embodiment 1 can be shared and collaboratively used to detect various gases having different absorption wavelength bands from each other as described below.

Figure 4:
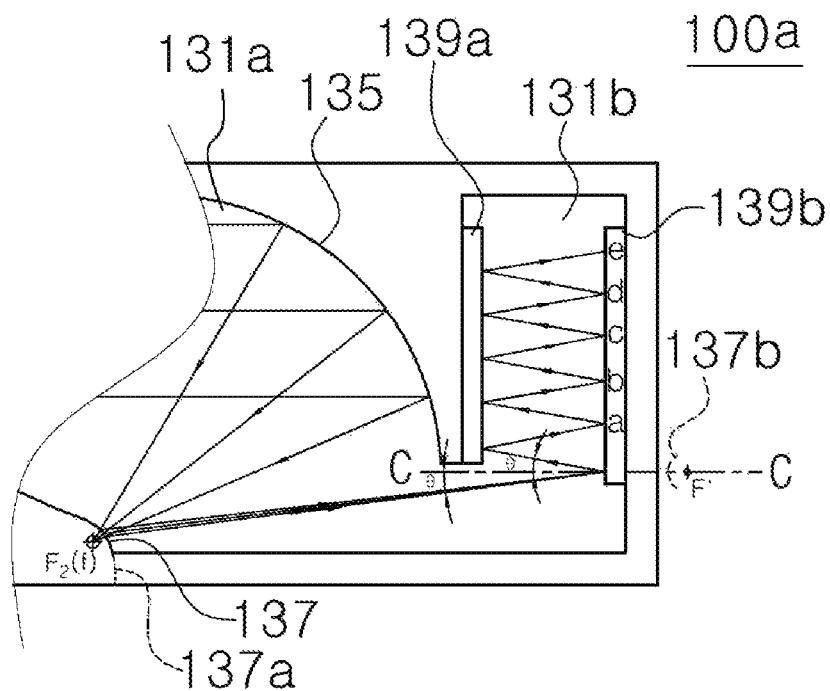
FIG. 4 is a plan view illustrating an optical cavity for a gas sensor according to preferred Embodiment 2 of the present invention.

FIG. 4 is a plan view illustrating the optical cavity for a gas sensor according to preferred Embodiment 2 of the present invention. For simplicity, a part of the configuration of the first space 131a is not illustrated in FIG. 4.

As illustrated in FIG. 4, the optical cavity 100' for a gas sensor according to Embodiment 2 further includes a pair of reflective mirrors 139a and 139b disposed on opposite wall surfaces in the longitudinal direction (the direction along the center line A-A) of the optical cavity 100' in the second space 131b. In this aspect, Embodiment 2 is different form the optical cavity 100 of Embodiment 1, and the other configurations are the same as Embodiment 1.

The pair of reflective mirrors 139a and 139b have a predetermined incident angle and serves to reflect the light made incident thereon at the same reflection angle as the incident angle. In this case, a light which is made incident on any one of the pair of reflective mirrors 139a and 139b (the reflective mirror 139b in FIG. 4) is reflected by the hyperbolic reflective surface 137 disposed at the position of any one focus f of two foci f and f' of the hyperbolas 137a and 137b, and travels to the other focus f' of the hyperbolas 137a and 137b, which is the light collected so as to maximize the converging properties and straightness of light as described in Embodiment 1.

In addition, as illustrated in FIG. 4, the light, which is reflected by the hyperbolic reflective surface 137 and is made incident on the reflective mirror 139b, is obliquely made incident thereon by a predetermined angle θ with respect to a direction perpendicular to the reflective mirror 139b (a direction along a line C-C in FIG. 4, i.e., a direction parallel to the direction along the center line A-A). Due to this configuration, the light made incident on the reflective mirror 139b of the pair of reflective mirrors 139a and 139b is reflected at the same angle (the reflection angle θ) as the incident angle θ, and is directed to the opposite reflective mirror 139a, then the light is continuously reflected by the reflective mirrors 139a and 139b in this order.

Therefore, according to the present embodiment, by adding the reflective mirrors having a simple configuration such as a pair of reflective mirrors 139a and 139b, the light is continuously reflected by the reflective mirror 139b, the reflective mirror 139a, and the reflective mirror 139b and . . . in this order. Therefore, the length of the optical path of the light reflected by the hyperbolic reflective surface 137 may be further extended.

Further, it is possible to extend the length of the entire optical path in the optical cavity 100 as necessary, by changing the length and width of the second space 131b and changing the incident angle θ of the light within a range in which no interference or the like occurs between the light made incident on the pair of reflective mirrors 139a and 139b and the light reflected by the same.

Furthermore, the optical cavity includes photodetector mounting parts formed at appropriate positions (for example, a, b, c, d, and e) among a plurality of incident positions (reflecting positions) of the pair of reflective mirrors 139a and 139b. The mounting part is equipped with the photodetector for detecting an optical signal and converting the detected optical signal into an electrical signal. Due to this configuration, by selecting a light having a wavelength suitable for the absorption wavelength band of the gas to be measured among lights having multi-wavelengths emitted from the light source 134 and traveling in the optical cavity 100', and arranging the photodetector at a position in which an absorption rate of the light having the selected wavelength can be maximized, the measurement accuracy of the gas concentration by the gas sensor can be maximized.

While the present invention has been described with reference to the preferred embodiments, the present invention is not limited to Embodiments 1 and 2, and various modifications and variations may be made therein without departing from the scope of the present invention.

In the above embodiments, the configuration, in which the first space 131a and the second space 131b are arranged on the same line as each other, has been described, but it is not limited thereto. The first space 131a and the second space 131b may be arranged parallel to each other. In this case, for example, by adding a focusing mirror or the like for changing the traveling path of the light reflected by the hyperbolic reflective surface 137, the light traveling path may be changed to a desired direction.

Further, in the above embodiment, the configuration, in which the optical cavity 100 or the optical cavity 100' includes the upper case 110 and the lower case 130 coupled to each other, has been described, but it is not limited thereto. The optical cavity 100 or the optical cavity 100' may be formed as a single body.

Furthermore, the configurations, in which the focus F2 of the second parabolic reflective surface 135 is disposed at the position apart from the center line A-A at a predetermined distance in the direction substantially perpendicular to the direction along the center line A-A in Embodiment 1, and the light, which is reflected by the hyperbolic reflective surface 137 and is made incident on the reflective mirror 139b, is made incident thereon at a predetermined angle θ in the direction (C-C direction) parallel to the direction along the center line A-A, and the pair of reflective mirrors 139a and 139b are disposed in the direction perpendicular to the center line A-A on the same line as the center line A-A in Embodiment 2, have been described, but it is not limited thereto. The light made incident on the reflective mirror 139b may be incident in a direction parallel to the center line A-A, and instead, the pair of reflective mirrors 139a and 139b may be disposed so as to be inclined by a predetermined angle θ with respect to the center line A-A.

In addition, Embodiments 1 and 2 and the modified examples thereof may be implemented in a combination thereof.

DESCRIPTION OF REFERENCE NUMERALS 100, 100' Optical cavity
133 First parabolic reflective surface
134 Light source
135 Second parabolic reflective surface
137 Hyperbolic reflective surface
139a, 139b Reflective mirror

What is claimed is:

1. An optical cavity for a gas sensor having a space defined therein, comprising: a first parabolic reflective surface formed on one wall surface in the space; a second parabolic reflective surface which is formed at a position facing the one wall surface, and is configured to reflect again a light emitted from a light source disposed at a focus of the first parabolic reflective surface and reflected by the first parabolic reflective surface so as to change a traveling path of the light; and a hyperbolic reflective surface formed so that any one focus of two foci coincides with a focus of the second parabolic reflective surface, and is configured to reflect the light made incident from the second parabolic reflective surface to change the traveling path of the light, wherein, when a value of a vertex in an x-axis direction of a hyperbola forming the hyperbolic reflective surface is a, a value of the focus is c, and a value of a vertex in a y-axis direction is b (b=a), a value of $c^2-b^2$ of a hyperbola represented by Equation below is in a range of $0 < c^2 - b^2 < 4$ mm $$y = \sqrt{\left(\frac{b^2}{c^2-b^2}\right)x^2 - b^2}.$$

2. The optical cavity for a gas sensor according to claim 1, further comprising a pair of reflective mirrors which are disposed so as to face each other in the space, and are configured to repeatedly reflect a light which is reflected by the hyperbolic reflective surface and made incident at a predetermined incident angle many times.

3. The optical cavity for a gas sensor according to claim 2, further comprising photodetector mounting parts formed corresponding to a plurality of light reflection positions of the pair of reflective mirrors.

4. A gas sensor for measuring a gas concentration, comprising:
the optical cavity for a gas sensor according to claim 1;
a light source disposed at the focus of the first parabolic reflective surface; and
a photodetector disposed in the space to detect a light emitted from the light source and traveling through the optical cavity for a gas sensor, and convert the detected light into an electrical signal.

* * * * *